US012606159B2

(12) United States Patent
Kuehner et al.

(10) Patent No.: US 12,606,159 B2
(45) Date of Patent: Apr. 21, 2026

(54) SYSTEMS AND METHODS OF DETECTING HAZARDS OF A LEADING VEHICLE

(71) Applicant: WOVEN BY TOYOTA, INC., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 195 days.

(21) Appl. No.: 18/345,950

(22) Filed: Jun. 30, 2023

(65) Prior Publication Data

US 2025/0002008 A1 Jan. 2, 2025

(51) Int. Cl.
| | |
|---|---|
| *B60W 30/09* | (2012.01) |
| *B60W 30/095* | (2012.01) |
| *B60W 30/18* | (2012.01) |
| *G06V 20/56* | (2022.01) |
| *G06V 20/58* | (2022.01) |
| *G06V 20/62* | (2022.01) |

(52) U.S. Cl.
CPC ........ *B60W 30/09* (2013.01); *B60W 30/0956* (2013.01); *B60W 30/18163* (2013.01); *G06V 20/58* (2022.01); *G06V 20/625* (2022.01); *B60W 2556/65* (2020.02)

(58) Field of Classification Search
CPC ............. B60W 30/09; B60W 30/0956; B60W 30/18163; B60W 2556/65; B60W 2420/403; G06V 20/58; G06V 20/625; G06V 20/56

USPC .......................................................... 701/301
See application file for complete search history.

(56) References Cited

U.S. PATENT DOCUMENTS

| | | | |
|---|---|---|---|
| 9,922,554 B2 | 3/2018 | Mikuni | |
| 10,217,354 B1 * | 2/2019 | Burke | G07C 5/008 |
| 10,239,527 B2 | 3/2019 | Hada | |
| 10,713,518 B2 | 7/2020 | Meng | |
| 10,726,274 B1 * | 7/2020 | Hasegawa | H04N 7/181 |
| 10,991,252 B2 | 4/2021 | Fan | |
| 10,997,430 B1 | 5/2021 | Slavin | |
| 11,414,088 B2 | 8/2022 | Ucar | |
| 2015/0160653 A1 | 6/2015 | Cheatham, III | |

(Continued)

*Primary Examiner* — Rachid Bendid
*Assistant Examiner* — Hossam M Abd El Latif
(74) *Attorney, Agent, or Firm* — SHEPPARD, MULLIN, RICHTER & HAMPTON LLP; Daniel N. Yannuzzi

(57) ABSTRACT

Systems and methods are provided to implement detecting a leading vehicle hazard. System and methods visually ascertain if certain driver risk factors are exhibited by a proceeding vehicle (and driver) that indicate the vehicle is potentially hazardous, such as obtaining images of an expired license plate on the vehicle. In response, a vehicle performs a computer-controlled maneuver so as to safely evade the potentially hazardous leading vehicle, thereby substantively lowering the potential of a dangerous collision with said vehicle which can lead to loss, damage, and/or bodily injury. For example, a system can include a vehicle sensor capturing image data of a leading vehicle. The system can also include a controller device that determines whether the leading vehicle is a hazard based on the image data, and generates a vehicle command that effectuates a computer-controlled automated driving maneuver or automated driving action to avoid collision with the leading vehicle.

19 Claims, 5 Drawing Sheets

(56) References Cited

U.S. PATENT DOCUMENTS

| | | |
|---|---|---|
| 2019/0126915 A1* | 5/2019 | Kim .................... B60W 30/09 |
| 2019/0239041 A1* | 8/2019 | Kume .................... H04W 4/02 |
| 2020/0168099 A1 | 5/2020 | Yamaguchi |
| 2020/0311446 A1 | 10/2020 | Nakada |
| 2021/0027630 A1* | 1/2021 | Fan ........................ G08G 1/012 |
| 2021/0107402 A1* | 4/2021 | Lee ........................ G08G 1/161 |
| 2021/0284176 A1 | 9/2021 | Wiesenberg |
| 2022/0215750 A1 | 7/2022 | Eldessouki |

* cited by examiner

100

ELECTRONIC
STORAGE
232

SENSORS 208

PROCESSOR(S) 234

MACHINE-READABLE INSTRUCTIONS 206

LEADING VEHICLE HAZARD
212

CONTROLLER 216

CLIENT COMPUTING
PLATFORM(S) 204

EXTERNAL
RESOURCES 230

200

SYSTEMS AND METHODS OF DETECTING HAZARDS OF A LEADING VEHICLE

TECHNICAL FIELD

The present disclosure relates generally to computer-controlled vehicle safety technology. In particular, image data associated with at least one proximately located vehicle is communicated and used in performing enhanced vehicle safety control features.

DESCRIPTION OF RELATED ART

Vehicle accidents (e.g., collisions) are a constant threat to drivers, passengers, pedestrians and property. Accidents, which unfortunately result in injury, in some instances, may be caused by the driver. For instance, "driver caused" accidents may be attributed to: a delay in a driver's recognition of a hazardous situation; the driver ability to react accordingly to a hazardous situation; and/or unknowingly maneuvering the vehicle in a manner that is extremely unsafe in the current conditions of the vehicle, road, and/or surroundings. According to NHTSA, there were over 7.2 million reported car accidents in 2016—many of which were avoidable.

BRIEF SUMMARY OF THE DISCLOSURE

In accordance with embodiments of the disclosed technology a system implement a leading vehicle hazard system and functions is disclosed herein. A system includes a vehicle sensor capturing image data of a leading vehicle. The image data corresponds to an area of the leading vehicle that displays visible identifiable information for the leading vehicle. The system also includes a controller device that determines whether the leading vehicle is a hazard based on the image data. Further, the controller device generates a vehicle command that effectuates a computer-controlled automated driving maneuver or automated driving action to avoid collision with the leading vehicle, in response to determining that the leading vehicle is a hazard.

In accordance with embodiments of the disclosed technology a non-transitory computer readable medium implement a leading vehicle hazard system and functions is disclosed herein. The non-transitory computer readable medium comprises instructions that cause a processor to capture image data of a leading vehicle. The image data corresponds to an area of the leading vehicle that displays visible identifiable information for the leading vehicle. The non-transitory computer readable medium includes further instructions that cause a processor to determine whether the leading vehicle is a hazard based on the image data; and generate a vehicle command that effectuates a computer-controlled automated driving maneuver or automated driving action to avoid collision with the leading vehicle, in response to determining that the leading vehicle is a hazard.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
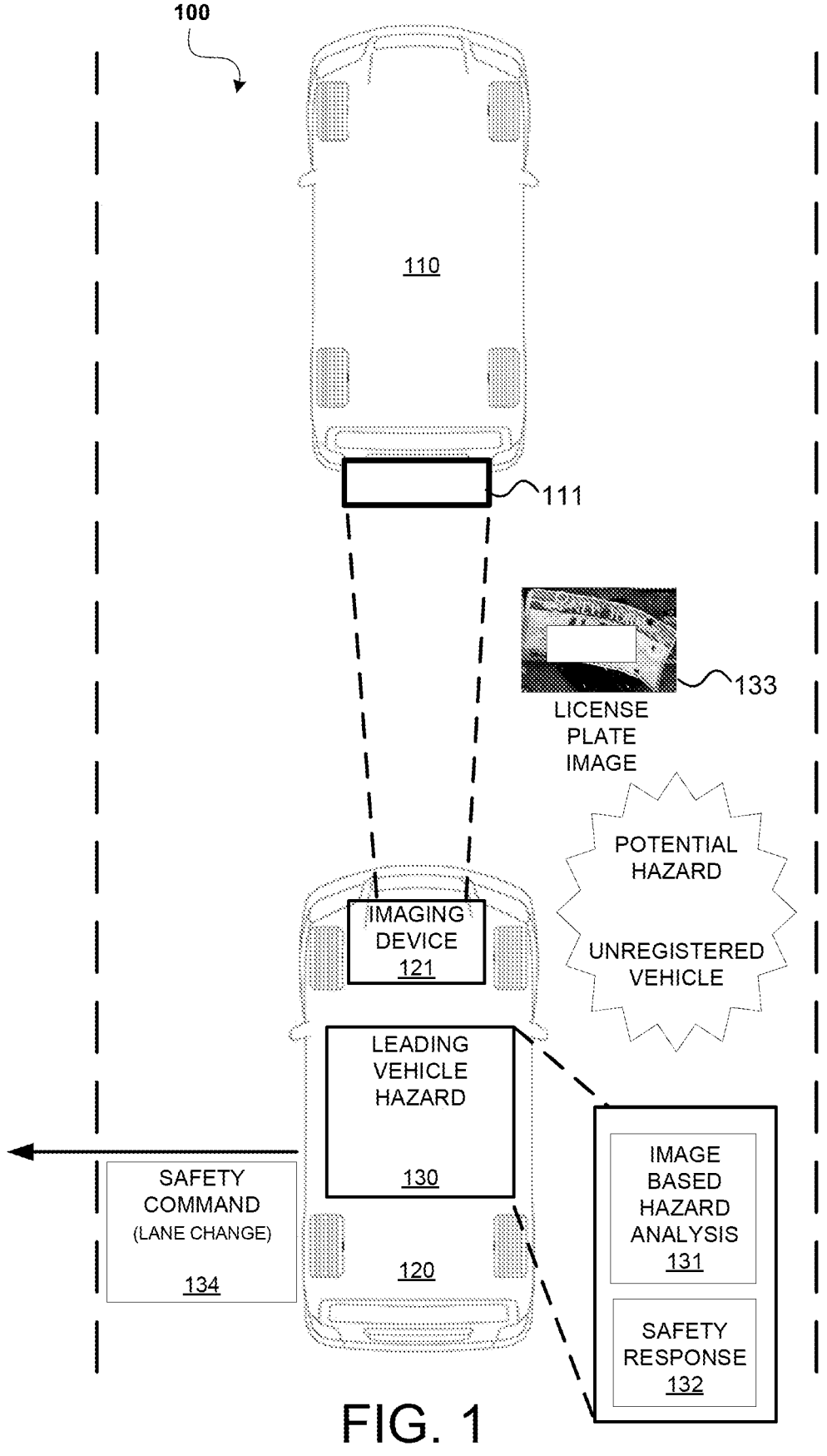
FIG. 1 is an example road environment including a vehicle implementing leading vehicle hazard detection during operational mode, for example, in accordance with an embodiment of the technology disclosed herein.

The figures are not exhaustive and do not limit the present disclosure to the precise form disclosed.

DETAILED DESCRIPTION

Some vehicles include computer-controlled operational modes, such as vehicles having adaptive cruise control mode, and automated vehicles, in which a computing system is used to navigate and/or maneuver the vehicle along a travel route. Furthermore, vehicles can include advancements and innovations in safety that help prevent crashes to protect the vehicle(s) and people. For example, some vehicles are equipped with technology, such as computer-controlled vehicle safety systems and collision avoidance systems, that are designed to support driver awareness, decision making and vehicle operation over a wide range of speeds. There are vehicle safety systems that provide features which help address several key areas of accident protection: preventing or mitigating frontal collisions (e.g., collision detection), keeping drivers within their lane (e.g., lane departure alert), and enhancing road safety during nighttime driving (e.g., automatic high beams). Moreover, the disclosed embodiments implement a leading vehicle hazard system that is designed to visually ascertain if certain driver risk factors are exhibited by a proceeding vehicle (and driver) that indicate the vehicle is potentially hazardous, for instance obtaining images of an expired license plate on the vehicle. In response, the leading vehicle hazard system can cause the ego vehicle to perform a computer-controlled maneuver so as to safely evade the potentially hazardous vehicle, thereby substantively lowering the potential of a dangerous collision with said vehicle which can lead to loss, damage, and/or bodily injury.

Problems surrounding a vehicle collision can be exacerbated in instances where the driver involved in the incident has additional risk factors, such as being an uninsured motorist, unlicensed motorist, or driving an unregistered vehicle. For example, if an accident occurs and one of the drivers is uninsured, a myriad of negative consequences immediately follows including having to sue for compensation through legal counsel (as the only way to recover damage related losses). Furthermore, drivers with certain risk factors may be difficult to identify (e.g., cannot identify/contact in case they cause an accident, hit and run, etc.) and more prone to risky and/or erratic behavior that may be potentially dangerous for other motorists on the road. According to a study conducted by AAA Foundation for Traffic Safety, drivers without a valid license are responsible for 20 percent of all automobile accidents. This means that on average, a car accident with an unlicensed driver cause about 8,400 deaths in the U.S. per year. Additionally, it has been reported that in the U.S. there is a 1 in 7 chance that an uninsured motorist is going to be involved in an accident. Unregistered vehicles (and vehicles registered out-of-state or outside of the U.S.) are also a substantial portion of the on-road vehicle population, which raises the potential of a driver being in a collision with a vehicle that is practically unidentifiable for various accident related purposes (e.g., police report, insurance claim, etc.). For instance, in the state of California (based on an analysis of more than 98,000 vehicle records) the average rate of unregistered vehicles being driven was found to be approximately 3.38%.

There are some existing collision avoidance systems that can detect that a nearby vehicle may pose a safety threat by observing the movement and/or maneuvering of that vehicle. For example, an existing collision avoidance system can detect that a proceeding vehicle traveling in an adjacent lane has suddenly swerved into the vehicle's current lane which could cause an accident. However, conventional collision avoidance systems are restricted by monitoring actions of the vehicle, but are not designed to determine whether a driver of a vehicle may have risk factors can be hazardous, such as being unregistered, uninsured, and the like. The disclosed embodiments distinctly equip vehicles with mechanisms that can use image data to detect whether a nearby vehicle may be associated with one or more risk factors, and as a result can automatically maneuver in relation to a vehicle that is deemed potentially hazardous in a manner that promotes safety (e.g., collision prevention). Therefore, the disclosed embodiments realize enhanced safety features that provides protection for drivers, passengers, people in other vehicles on the road, and pedestrians from harm and even further may mitigate financial loss (e.g., litigation, etc.) and property loss (e.g., damaged vehicle, etc.) that is often related to accidents with high risk drivers (e.g., uninsured, unlicensed, etc.).

Referring now to FIG. 1, an example of a road environment is depicted, which includes a vehicle 110 traveling on a roadway with a vehicle 120 that is configured to implement the leading vehicle hazard system 130 and functions, as disclosed herein. FIG. 1 illustrates that while the vehicle 120 is operational, for instance being driven by a human driver, the vehicle 120 may be traveling at a certain speed in a lane on the roadway. While vehicle 120 is being driven along the road, FIG. 1 depicts that another vehicle 110 is also proximately traveling along the same portion of the roadway. In particular, vehicle 110 is illustrated as traveling in the same lane (e.g., center lane) and directly preceding vehicle 120. Accordingly, for purposes of discussion, vehicle 110 is referred to as a "leading vehicle" (or ado vehicle) with respect to its ahead positioning in relation to vehicle 120. This is a common road environment in several different real life scenarios, for instance driving during rush hours, driving in densely populated areas (e.g., metropolitan areas), and the like. Furthermore, with vehicle 120 traveling in such close proximity to vehicle 110 (directly behind, in the same lane) there may be an increased potential of a collision between the vehicles 110, 120, for instance if leading vehicle 110 suddenly performs a risky maneuver such as abruptly decelerating and/or stopping in front of vehicle 120.

For purposes of illustration, vehicle 110 is also being operated by a driver with one or more risk factors which ultimately cause the vehicle 110 to be unidentifiable. For example, the driver of vehicle 110 may have failed to register the vehicle 110 with its appropriate jurisdiction (e.g., state DMV). As a result, a rear license plate 111 of vehicle 110 does not display the visual identifiers (e.g., registration stickers) which indicate that the vehicle 110 is properly registered with a local and/or recognized DMV. FIG. 1 illustrates that the rear license plate 111 has no visible registration sticker(s) that could be used to identify the current owner/driver of vehicle 110, or to further determine that the vehicle 110 is currently registered and is being operated lawfully. Accordingly, in the event of a collision with vehicle 110, there may be no record and/or an incorrect record (e.g., vehicle still registered to a previous owner) associated with vehicle 110 that a person on the scene of an accident (e.g., police officer) can access in order to contact, locate, or otherwise accurately identify a driver/owner of vehicle 110. Without being able to retrieve important motorist information, such as the driver/owner name, address, phone number, then identifying the driver/owner and whereabouts of the vehicle 110 may not be obtainable, thereby effectively rendering the vehicle 110 unidentifiable for necessary proceedings after an accident such as filing an accident report, insurance claim, and the like. In order to mitigate this disastrous situation for the driver of ego vehicle 120, the leading vehicle hazard system 130 has the capability to identify risk factors of the leading vehicle from image data obtained of vehicle 110 and maneuver in a manner that avoids collision with the high risk, or potentially hazardous, vehicle 110 which can be dangerous and exacerbated by vehicle 110 being substantively unidentifiable.

In the example of FIG. 1, the vehicle 120 may be equipped with at least one image device 121 which has imaging capabilities and is particularly situated to obtain image data of one or more proximately located vehicles in the vicinity of vehicle 120. FIG. 1 illustrates the image device 121 being arranged near the front of the vehicle 120, for instance implemented as an on-vehicle front-facing camera, in order to capture images of the leading vehicle 110 traveling in the same lane of the roadway as vehicle 120 that can be analyzed for purposes of determining whether the vehicle 110 is associated with risk factors or otherwise hazardous. The imaging device 121 can be implemented as an digital imagery system or sensors (e.g., cameras, LIDAR, radar, ultrasonic sensors) that are external on integrated with the vehicle (e.g., on-vehicle), which are capable of capturing image data, images, video, visual data, visual renderings, and the like. Further, in some embodiments, the imaging device 121 enables additional collision avoidance related functions, such as real-time detection of traffic parameters, such as the presence of other vehicles, vehicle speed, and vehicle movement, traffic, and the like, within the vehicle's 120 vicinity along the route.

In operation with the leading vehicle hazard system 130, the imaging device 121 is employed to capture images of area(s) of the leading vehicle 110 such as license plates, bumpers, windshields, etc. that may display visual cues that may be indicative of the vehicle 110 having one or more risk factors including being unregistered, expired registration, uninsured driver, and the like. FIG. 1 illustrates an example of the imaging device 121 capturing image data 133 of the leading vehicles 110's rear license plate 111. However, this example is not intended to be limiting and the disclosed imaging device 121 and system 130 can obtain and utilize image data from other areas of the leading vehicle 110 as deemed necessary and/or appropriate. For instance, in some states in the U.S. there is additional vehicle registration information (e.g., expiration date, registration state, etc.) that is displayed in a front windshield of a vehicle in addition to a front license plate and a rear license plate. In an embodiment, the system 130 can capture images from multiple areas of the leading vehicle 110 to verify analysis and increase accuracy of results, for instance comparing whether the leading vehicle's 110 rear license plate, windshield, and rear license plate all show visual indications of a hazard.

As seen in FIG. 1, the imagining device 121 captures at least one image 133 (also referred to herein as image data) of the rear license plate 111 attached to the leading vehicle 110. The captured image data 133 conveys that the license plate 111 is severely damaged and has no current registration stickers visibly displayed. These visible cues captured in the image data 133 can indicate that the leading vehicle 110 has a substantial potential of being unregistered (e.g., stolen license plate) and/or having expired registration (e.g., no valid registration stickers) which may be deemed as hazards in accordance with the leading hazard system 130. Subsequently, the image data 133 that was captured of the leading vehicle 110 is input into the leading vehicle hazard system 130. The leading vehicle hazard system 130 is configured to perform image analysis on the received image data 133 in order to determine whether the leading vehicle 120 is hazardous, and ultimately trigger autonomous actions to avoid collision if the vehicle 110 is deemed to be high risk.

Particularly, vehicle 120 is shown to include a leading vehicle hazard system 130. The leading vehicle hazard system 130 can be implemented as a vehicle controller, computing hardware, software, firmware, or a combination thereof, which is programmed to detect visual indications that a vehicle is hazardous and/or associated with risk factors, in accordance with the disclosed techniques. The leading vehicle hazard system 130 may be a standalone controller in some embodiments. Alternatively, the leading vehicle hazard system 130 may be implemented by configuring a main vehicle onboard processor or CPU. Further, FIG. 1 illustrates that the leading vehicle hazard system 130 can include several other components, including, but not limited to: image based hazard analysis device 131; and a safety response device 132. In some embodiments, the vehicle 120 can obtain image data from the other communicatively connected vehicles within its vicinity on the road (e.g., V2V network), where this additional image data may also be processed by the leading vehicle hazard system 130. For example, other vehicles in adjacent lanes of the road or traveling in front of vehicle 110 may capture additional images of the leading vehicle 110 from other perspectives, and these images can be cooperatively fused and serve as input to the leading vehicle hazard system 130 for analysis.

The image based analysis hazard analysis device 131 can comprise a processor that is programmed with the instructions and data to perform image analysis of received image data of the leading vehicle, and defines a correlation between visual indicators that may be observed as result of the image analysis and hazards and/or risk factors that can be determined from the observance of these visual indicators. Accordingly, the image based hazard analysis device 131 is configured with image analysis software and/or algorithms that enables various imagery analysis functions. The image based hazard analysis device 131 can be programmed to extract meaningful information from images (e.g., digital images) of a vehicles by means of digital image processing techniques. As an example, the image based hazard analysis device 131 may perform image analysis tasks such as focusing on areas of the vehicle that display pertinent information, such as license plates, windshields, etc., and recognizing specified hazard information from these areas of the vehicle that may be indicative to certain risk factors. Examples of hazard information that may be recognized from image data (based on image analysis) can include, but is not limited to: damaged license plate(s)/tags; license plate/tag number (e.g., missing numbers/letters, unrecognized and/or invalid tag number); missing license plate(s)/tags; missing registration sticker(s); date (e.g., month/year) associated with tags; color of registration sticker(s) (e.g., color corresponds to registration expiration year); state of license plate(s)/tags (e.g., domestic to U.S.); country of license plate(s)/tags (e.g., foreign to U.S.); diplomat license plate(s)/tags; and other visual indicators that relate to the aforementioned hazards and driver/vehicle risk factors. In some embodiments, the image based hazard analysis device 131 is capable of using image analysis to identify traits and characteristics of a human driver of a vehicle, and may determine if a vehicle's driver may be linked to certain risk factors, such as being uninsured, unlicensed, intoxicated, criminal history, record of traffic incidents, and the like. Furthermore, in some embodiments, the image based hazard analysis device 131 may have the capability to access databases and/or records of third party entities. An external third party may having information pertinent to accessing risk factors, such as state DMVs, insurance companies, police, and the like. The image based hazard analysis device 131 can contact a third party and receive supplemental data which contributes to determining whether a vehicle is a potential hazard. For example, insurance companies may provide data indicating that there are no current insurance policies associated with a license plate number that has been extract from images obtained by the system 130. Thus, the image based hazard analysis device 131 may use this third party data, in addition to the hazard information it has directed obtained visually, in order to determine that a vehicle has a high risk of being unregistered and being driven by an uninsured motorist, for example.

Also, the image based hazard analysis device 131 is configured to further process the results of image analysis to detect whether a vehicle is potentially hazardous. The image based hazard analysis device 131 can be programmed to define a correlation between recognized hazard information (based on image analysis) and one or more risk factors that are used to deem the vehicle a hazard. As an example, the image based hazard analysis device 131 can be programmed to correlate a missing license plate (recognized by analysis of the image data) to several risk factor(s) that are determined to be hazardous by the system 130, such as vehicle being unregistered, having expired registration, or being a stolen vehicle. Examples of defined correlations between risks factors that serve as a detection of a hazard can include, but are not limited to: damaged license plate(s)/tags correlates to unregistered vehicle; missing license plate(s)/tags correlates to unregistered, stolen; unrecognizable or invalid license plate/tag number correlates to unregistered, stolen; missing registration sticker(s) correlates to unregistered, expired registration; past date (e.g., month/year) of license/ tags correlates to expired registration; unused/past color of registration sticker(s) correlates to expired registration; out of state of license plate(s)/tags corelates to potentially unregistered; out of country of license plate(s)/tags correlates to potentially unregistered; diplomat license plate(s)/tags correlates to potentially unregistered; and other visual indicators can be correlated to one or more of the aforementioned hazards and driver/vehicle risk factors.

Referring back to the example of FIG. 1, the image based hazard analysis device 131 can perform image analysis on the received image data 133, and extract essential information from these images to determine if the leading vehicle 110 is potentially a hazard for the vehicle 120. For instance, the image based hazard analysis device 131 can recognize, by analyzing image 133, that the rear license plate 111 is damaged and is missing current registration stickers. By extracting this key hazard information from the analyzed imagery, the image based hazard analysis device 131 can visually detect that the leading vehicle 110 may have certain risk factors associated with it. In this case, the image based hazard analysis device 131 applies the defined correlations to determine that the leading vehicle 110 has a high risk of being an unregistered vehicle based on observing the damaged tags and missing registration.

In response to the image based hazard analysis device 131 making the determination that the vehicle is a potential hazard, the image based hazard analysis device 131 send an output to the safety response device 132. Once the safety response device 132 is aware that the nearby vehicle has been detected as hazardous by the image based hazard analysis device 131, the safety response device 132 can generate an appropriate safety maneuver (e.g., autonomous) for collision avoidance with hazardous vehicle.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to the leading vehicle hazard system 130 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the leading vehicle hazard techniques and response can be highly, or fully, automated. For example, the leading vehicle hazard system 130 can be configured to communicate controls so as to operate the vehicle 120 autonomously and safely. For example, after the safety response device 132 communicates a safety command 134 to the vehicle 120 operating as an autonomous vehicle, the vehicle 120 can automatically perform the necessary adjustments (e.g., accelerating or decelerating) with no human driver interaction. Accordingly, vehicle 120 can operate with respect to safety commands, or controls in response to detecting a hazardous leading vehicle, the in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the leading vehicle hazard techniques and response can be partially automated. In an example, the safety response device 132 communicates a newly generated (or updated) control to the vehicle 120 operating as a semi-autonomous vehicle, under adaptive cruise control features. The vehicle 120 can automatically perform the some of the necessary adjustments (e.g., accelerating) with no human driver interaction. Alternatively, the vehicle 120 may notify a driver that driver input is necessary in response to a new (or updated) safety command 134. For instance, upon detecting that the leading vehicle is potentially hazardous and a potential collision (e.g., close proximity) with vehicle 110 is imminent, the vehicle 120 may receive a safety command from the safety response device 132 to automatically control (e.g., reduce) the vehicle's 120 speed to ensure that the driver is travelling cautiously. In response, vehicle 120 can also present a notification in its dashboard display that reduced speed is required, because of the safety constraints. The notification allows time for the driver to press the brake pedal and decelerate the vehicle 120 to travel at a speed that is safe.

As alluded to above, vehicle 120 in the environment 100 has the capability to be autonomously driven. In this case, one or more safety commands 134 can be defined and generated by the safety response device 132 that are designed to achieve a desired safety factor (e.g., collision avoidance) for the vehicle 120 during autonomous operations. The safety response device 132 can comprise a processor that is programmed with the instructions and data to generate one or more safety commands 134 to control the vehicle in a manner that avoids collision with (or otherwise safely maneuvers away from being in close proximity to) a hazardous leading vehicle. In the example, the safety response device 132, upon receiving a determination that the leading vehicle is hazardous from the image based hazard analysis device 131, generates automatic (or semi-autonomous) safety maneuver that is conveyed to the vehicle 120 via the safety command 134, which enable automatic drive-controls of vehicle 120 in a manner that is governed by one or more safety constraints (e.g., target lead/trail distance, target speed, etc.) principally focused to "avoid collision" with a hazardous vehicle during operation in its current environment 100. The safety command 134 generated by the safety response device 132 can implement semi-autonomous (e.g., partially computer-controlled) or fully autonomous operations for a vehicle. Examples of safety maneuvers that are communicated in the safety command 134 can include, but are not limited to: increasing speed; decreasing speed; changing directions; lane change; and the like.

Referring back to the example of FIG. 1, the safety response device 132 can receive an output from the image based hazard analysis device 131 indicating that the leading vehicle 110 is determined to be hazardous, namely having a risk factor of being unregistered based on the visual observations that its rear license plate 111 is severely damaged and missing current registration stickers. As previously described, having an accident with a vehicle having a risk factor, such as being unregistered, can be significantly problematic. For example, if vehicle 110 were to cause a collision with vehicle 120 and the driver of vehicle 110 decides to flee the scene of the accident (e.g. evading financial responsibility, criminal charges, etc.), because the vehicle 110 has a highly likelihood of being unregistered (from the visually obtained hazard information) it is probable that the car and driver will not being able to be identified at a later date, and the driver of vehicle 120 will not be have all of the information needed to fully complete accident related tasks, such as filling out an insurance claim, contacting the driver, filing a police report, and the like. Furthermore, the leading vehicle hazard system 130, as disclosed herein, implements a distinct form of hazard detection that is not limited to how the vehicle is being driven. As previously alluded to, many conventional collision avoidance systems depend solely on observing when a vehicle performs dangerous maneuvers, such as reaching dangerous speeds, erratic movement, swerving, improper lane changes, and the like, in order to determine that the vehicle is a hazard and/or a safety threat. In contrast, even if the leading vehicle 110 is being driven nominally and would otherwise not be detected as being hazardous by conventional collision avoidance systems, the leading vehicle hazard system 130 would still be able to use other visible indications (e.g., license plate) that the vehicle 110 is potentially hazardous and should be avoided.

Accordingly, the safety response device 132 can determine that the vehicle 120 should maneuver away from vehicle 110 by changing lanes, after the system 130 has deemed the vehicle 110 as potentially hazardous. For example, the safety response device 132 may detect that an adjacent lane (e.g., left-most lane) is unoccupied, and thus generates the safety command 134 to effectuate an autonomous lane change maneuver which controls the vehicle 120 movement into the left lane to safely avoid being in close proximity to the hazardous vehicle 110, and mitigate any problems that may arise from not being able to identity the vehicle 110. The safety response device 132 can trigger for other functions which may supplement the safety maneuver, such generating notifications, warnings, alerts, and other visual, audio, and tactile outputs that enable drivers to make safer actions in operating the vehicle 120, and provide additional reaction time. Additionally, the safety response device 132 may generate notifications, warnings, alerts, for operators of other vehicles that may be traveling on the road behind vehicle 120, and thus are approaching the section of the road where the hazardous vehicles 110 is currently traveling. For example, drivers of the upcoming vehicles that can be communicatively connected to vehicle 120 are also informed about the hazardous vehicle 110 that is currently driving along the road (and other changes in the traffic conditions) such that those drivers have additional time to revise their actions or routes accordingly to avoid collision and/or proximity with vehicle 110.

Consequently, the leading vehicle hazard system 130, as disclosed herein, realizes enhanced vehicle safety features that can visually identify (e.g., image data and image analysis) that a vehicle may be associated with risk factors and/or is potentially hazardous. Particularly, the disclosed embodiments capture and analyze images of certain areas of a vehicle, such as a license plate, to detect visual indications of high risk for a vehicle in a manner that is not concerned without needing to observe how the vehicle is maneuvering.

Figure 2:
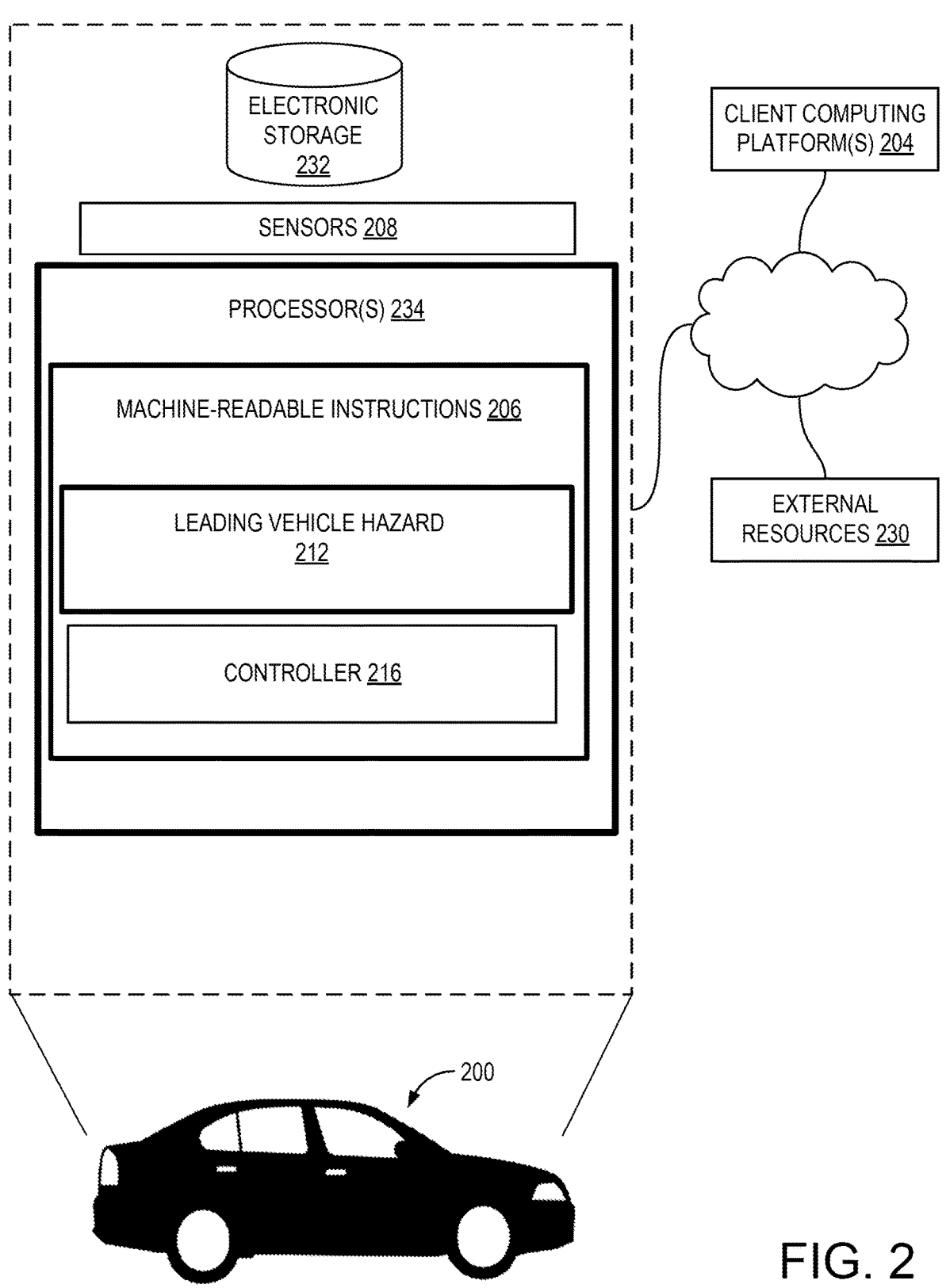
FIG. 2 is a schematic representation of an example vehicle with which embodiments of the leading vehicle hazard detection system disclosed herein may be implemented.

FIG. 2 illustrates a vehicle 200, for instance an autonomous vehicle, configured for implementing the disclosed leading vehicle hazard detection capabilities. In particular, FIG. 2 depicts the vehicle 200 including a leading vehicle hazard detection component 214. According to the disclose embodiments, the leading vehicle hazard component 214 is configured to execute several enhanced vehicle safety capabilities, including: capturing one or more images of a specified area of another proximately located vehicle, such as the rear license plate; analyzing the images to extract hazard information that may be indicative that the vehicle is associated with risk factors and/or is hazardous; analyzing the images to identify a driver of a vehicle and/or access associated driving records; determine whether a vehicle is a potential hazard based on the hazard information extract from images; and execute autonomous safety maneuvers to safely evade the vehicle that is determined to be hazard.

In some implementations, vehicle 200 may also include sensors 208, electronic storage 232, processor(s) 234, and/or other components. Vehicle 200 may be configured to communicate with one or more client computing platforms 204 according to a client/server architecture and/or other architectures. In some implementations, users may access vehicle 200 via client computing platform(s) 204.

Sensors 208 may be configured to generate output signals conveying operational information regarding the vehicle. The operational information may include values of operational parameters of the vehicle. The operational parameters of vehicle 200 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 200 tires and roadway, distance from center of gravity of vehicle 200 to front axle, distance from center of gravity of vehicle 200 to rear axle, total mass of vehicle 200, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 200. In some implementations, at least one of sensors 208 may be a vehicle system sensor included in an engine control module (ECM) system or an electronic control module (ECM) system of vehicle 200. In some implementations, at least one of sensors 208 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 208 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 200. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 208 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 208 may include virtual sensors, imaging sensors, depth sensors, cameras, and/or other sensors. As used herein, the term "camera", "sensor" and/or "image sensor" and/or "imaging device" may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 208 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 232, such that captured information may be stored, at least initially, in the integrated embedded storage of a particular vehicle, e.g., vehicle 200. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 200 may be configured by machine-readable instructions 206. Machine-readable instructions 206 may include one or more instruction components. The instruction components may include computer program components. The instruction components may include one or more of: a leading vehicle hazard component 212; a controller 216, and/or other instruction components.

As a general description, the illustrated components within the machine-readable instructions 206 include the leading vehicle hazard component 212. As previously described in reference to FIG. 1, the leading vehicle hazard component 212 is configured to execute image capture and analysis to detect that an ado vehicle, for example, has at least one visible indication of risk factors, such as a missing or an obstructed license plate. The leading vehicle hazard component 212 can utilize one or more vehicle sensors 208 (e.g., camera) to capture image data of the ado vehicle. In response to determining that the ado vehicle is a hazard due to analyzing the images (e.g., missing license plate indicates the vehicle may be unregistered), the leading vehicle hazard component 212 can effectuate an autonomous safety maneuver, which allows the ego to avoid collision and/or close proximity to a hazardous ado vehicle. The leading vehicle hazard component 212 generates a safety command to control the vehicle's 200 operation according to the functioning automation levels of the vehicle 200. For example, the commands generated may be specific to one or more of: level 0 (no driving automation); level 1 (driver assistance); level 2 (partial driving automation); level 3 (conditional driving automation); level 4 (high driving automation); and level 5 (full driving automation). In this way, the leading vehicle hazard component 212 may execute varying levels of automation actions that control the vehicle 200 to avoid potential hazards associated with unidentified vehicles, unverified owners, and the like.

Figure 3:
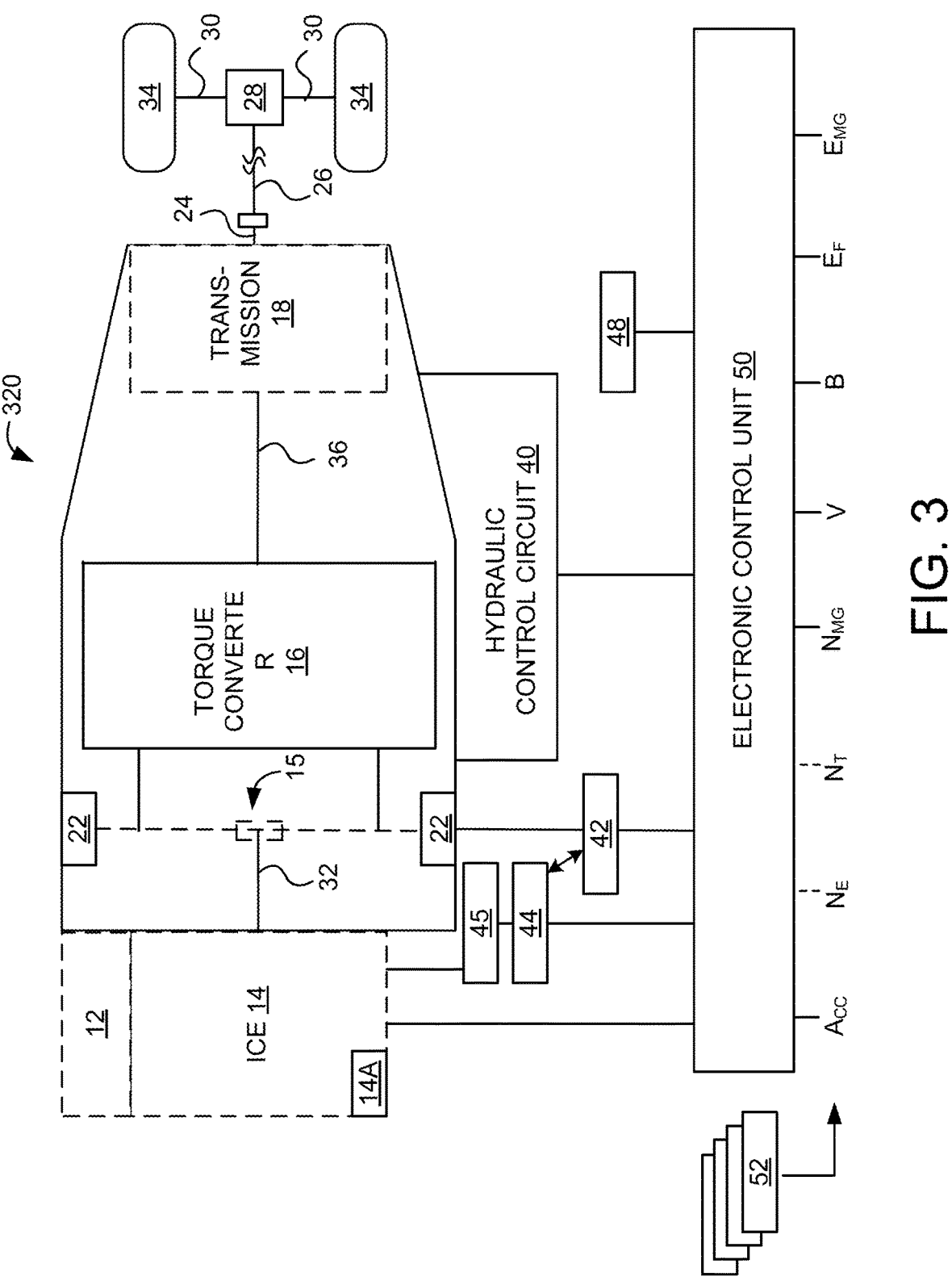
FIG. 3 illustrates an example vehicle with which embodiments of the disclosure may be implemented.

FIG. 3 illustrates a drive system of a vehicle 320 that may include the leading vehicle hazard detection system disclosed herein. As seen in FIG. 3, the vehicle 320 can include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 320 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 320 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 320 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 320 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 3, electronic control unit 50 receives information from a plurality of sensors included in vehicle 320. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/ pressure, B, battery SOC (i.e., the charged amount for battery 44 detected by an SOC sensor). Accordingly, vehicle 320 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 320, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 320.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 320 and/or information/data about such objects. Such objects can be stationary objects and/or dynamic objects. Further, the sensors can be configured to detect, measure, quantify and/or sense other things in the external environment of the vehicle 320, such as, for example, lane markers, signs, traffic lights, traffic signs, lane lines, crosswalks, curbs proximate the vehicle 320, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 320 and/or information/data about such objects. Such objects can be stationary objects and/or dynamic objects. Further, the sensors can be configured to detect, measure, quantify and/or sense other things in the external environment of the vehicle 320, such as, for example, lane markers, signs, traffic lights, traffic signs, lane lines, crosswalks, curbs proximate the vehicle 320, off-road objects, etc.

Figure 4:
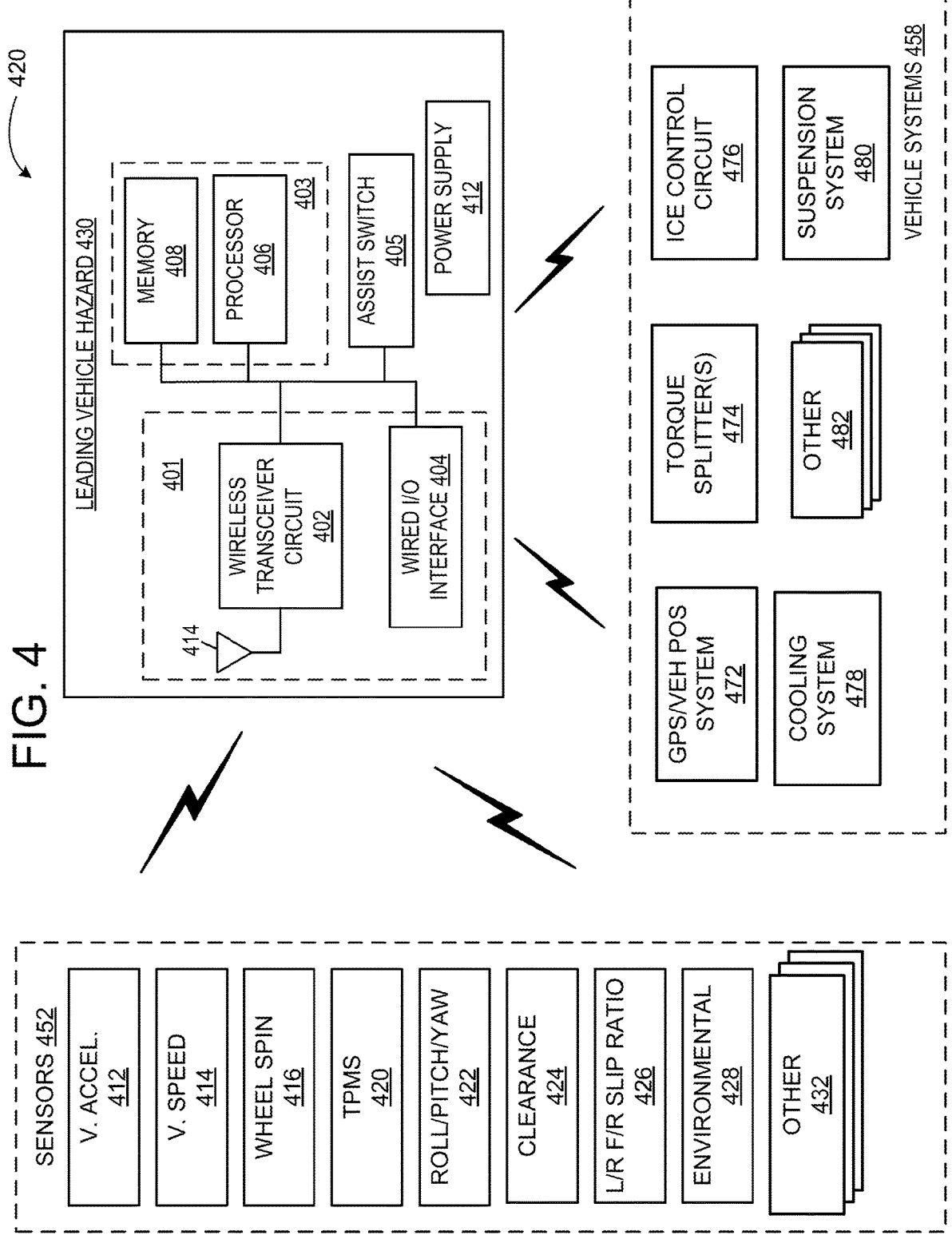
FIG. 4 illustrates an example communication architecture of the vehicle shown in FIG. 1 implementing the disclosed leading vehicle hazard detection, in accordance with an embodiment of the technology disclosed herein.

Although the example of FIG. 4 is illustrated using processor and memory circuitry, as described below with reference to circuits disclosed herein, leading vehicle hazard system 430 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the leading vehicle hazard system 430.

Communication circuit 401 either or both a wireless transceiver circuit 402 with an associated antenna 414 and a wired I/O interface 404 with an associated hardwired data port (not illustrated). As this example illustrates, communications with leading vehicle hazard system 430 can include either or both wired and wireless communications circuits 401. In some embodiments, the communication circuit 401 may implement the IR wireless communications from the vehicle to a hydrogen fueling station. Wireless transceiver circuit 402 can include a transmitter and a receiver (not shown) to allow wireless communications via any of a number of communication protocols such as, for example, WiFi, Bluetooth, near field communications (NFC), Zigbee, IrDA, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by leading vehicle hazard system 430 to/from other entities such as sensors 452 and vehicle systems 458.

Wired I/O interface 404 can include a transmitter and a receiver (not shown) for hardwired communications with other devices. For example, wired I/O interface 404 can provide a hardwired interface to other components, including sensors 452 and vehicle systems 458. Wired I/O interface 404 can communicate with other devices using Ethernet or any of a number of other wired communication protocols whether standardized, proprietary, open, point-to-point, networked or otherwise.

Power supply 412 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 452 can include, for example, sensors 52 such as those described above with reference to the example of FIG. 3. Sensors 452 can include additional sensors that may or not otherwise be included on a standard vehicle 420 with which the leading vehicle hazard system is implemented. In the illustrated example, sensors 452 include vehicle acceleration sensors 412, vehicle speed sensors 414, wheelspin sensors 416 (e.g., one for each wheel), a tire pressure monitoring system (TPMS) 420, accelerometers such as a 3-axis accelerometer 422 to detect roll, pitch and yaw of the vehicle, vehicle clearance sensors 424, left-right and front-rear slip ratio sensors 426, and environmental sensors 428 (e.g., to detect salinity or other environmental conditions). Additional sensors 432 can also be included as may be appropriate for a given implementation.

Vehicle systems 458 can include any of a number of different vehicle components or subsystems used to control or monitor various aspects of the vehicle and its performance. In this example, the vehicle systems 458 include a GPS or other vehicle positioning system 472; torque splitters 474 they can control distribution of power among the vehicle wheels such as, for example, by controlling front/rear and left/right torque split; engine control circuits 476 to control the operation of engine (e.g. Internal combustion engine 14); cooling systems 478 to provide cooling for the motors, power electronics, the engine, or other vehicle systems; suspension system 480 such as, for example, an adjustable-height air suspension system, and other vehicle systems.

During operation, leading vehicle hazard system 430 can receive information from various vehicle sensors 452. Also, the driver may manually activate the cruise control mode by operating switch 405. Communication circuit 401 can be used to transmit and receive information between the leading vehicle hazard system 430 and sensors 452, and leading vehicle hazard system 430 and vehicle systems 458. Also, sensors 452 may communicate with vehicle systems 458 directly or indirectly (e.g., via communication circuit 401 or otherwise).

Figure 5:
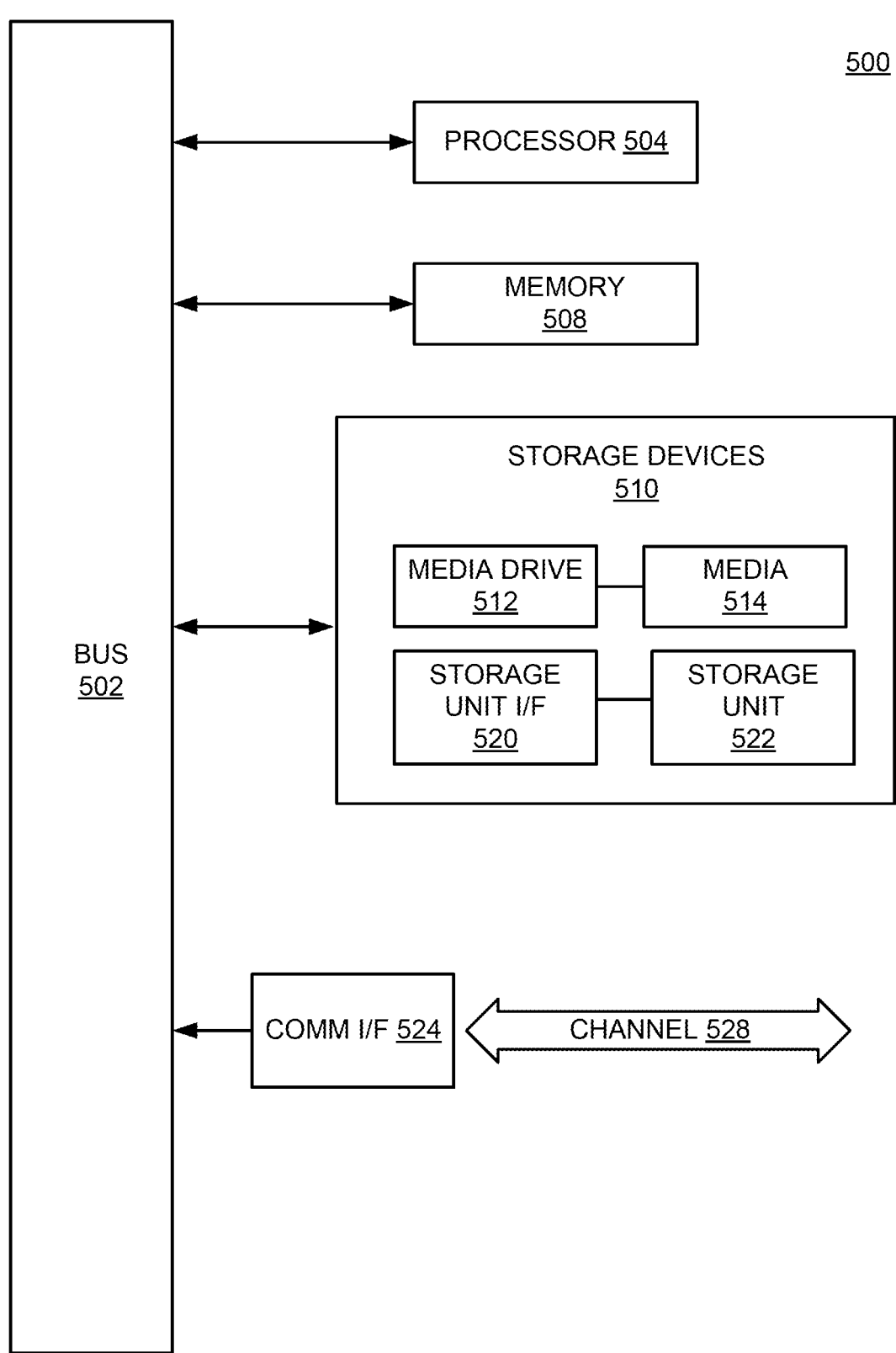
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the leading vehicle hazard detection functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system of a vehicle comprising:
one or more processors; and
memory storing instructions that, when executed by the one or more processors, cause the one or more processors to perform:
determining whether identification information of a leading vehicle is missing, unrecognizable, invalid, or blemished based on image data of the leading vehicle;
in response to determining that the identification information of the leading vehicle is missing, unrecognizable, invalid, or blemished, generating a vehicle command that effectuates a computer-controlled automated driving maneuver or a computer-controlled automated driving action to avoid collision with the leading vehicle; and
causing the vehicle to perform the computer-controlled automated driving maneuver or the computer-controlled automated driving action according to the vehicle command.

2. The system of claim 1, wherein the image data corresponds to an area of the leading vehicle that displays visible identifiable information, the area corresponding to: a rear license plate, a front license plate, a front windshield, or a rear windshield.

3. The system of claim 2, wherein the instructions that, when executed by the one or more processors, cause the one or more processors to analyze the image data of the leading vehicle to extract potentially missing, unrecognizable, invalid, or blemished identification information for the leading vehicle.

4. The system of claim 3, wherein the potentially missing, unrecognizable, invalid, or blemished identification information comprises at least one or more of: missing license plate number, missing license plate, damaged license plate, out of state license plate, foreign license plate, missing registration sticker, invalid registration sticker, or a visual indicia that identifies a likelihood of an uninsured driver.

5. The system of claim 4, wherein the instructions that, when executed by the one or more processors, cause the one or more processors to determine that the leading vehicle has potentially missing, unrecognizable, invalid, or blemished identification information based on analyzing the image data of the leading vehicle.

6. The system of claim 5, wherein the instructions that, when executed by the one or more processors, cause the one or more processors to determine that the leading vehicle has potentially missing, unrecognizable, invalid, or blemished identification information by corresponding the potentially missing, unrecognizable, invalid, or blemished deficient identification information to a defined missing, unrecognizable, invalid, or blemished characteristic of the identification information deficiency.

7. The system of claim 1, wherein the instructions that, when executed by the one or more processors, cause the one or more processors to generate the vehicle command based on an active level of automation.

8. The system of claim 3, wherein the instructions that, when executed by the one or more processors, cause the one or more processors to generate a notification in response to determining that the leading vehicle has potentially missing, unrecognizable, invalid, or blemished identification information.

9. The system of claim 8, wherein the notification comprises an identification of the leading vehicle having potentially missing, unrecognizable, invalid, or blemished identification information and the notification is communicated to a plurality of communicatively connected vehicles that are behind the vehicle via a network, wherein the vehicle is directly behind the leading vehicle.

10. The system of claim 9, wherein the network comprises a vehicle-to-vehicle (V2V) communication.

11. The system of claim 2, wherein the image data corresponds to the rear license plate of the leading vehicle.

12. The system of claim 11, wherein the instructions that, when executed by the one or more processors, cause the one or more processors to communicate a license plate number to a database to retrieve additional data related to the leading vehicle or a driver of the leading vehicle.

13. The system of claim 9, wherein the notification is communicated to the plurality of communicatively connected vehicles as a warning that the identification information of the leading vehicle is missing, unrecognizable, invalid, or blemished.

14. The system of claim 1, wherein the computer-controlled automated driving maneuver or the computer-controlled automated driving action comprises one or more of: a lane change maneuver, acceleration, and deceleration.

15. A non-transitory computer readable medium comprising instructions, that when read by a processor, cause the processor to perform:

determining whether identification information of a leading vehicle is missing, unrecognizable, invalid, or blemished based on image data of the leading vehicle;

in response to determining that the identification information of the leading vehicle is missing, unrecognizable, invalid, or blemished, generating a vehicle command that effectuates a computer-controlled automated driving maneuver or a computer-controlled automated driving action to avoid collision with the leading vehicle; and causing the vehicle to perform the computer-controlled automated driving maneuver or the computer-controlled automated driving action according to the vehicle command.

16. The non-transitory computer readable medium of claim 15, wherein the image data is communicated via a network from a plurality of communicatively connected vehicles capturing image data of the leading vehicle.

17. The system of claim 1, wherein determining that the identification information of the leading vehicle is missing, unrecognizable, invalid, or blemished is based on a damaged license plate or a damaged registration sticker.

18. The system of claim 1, wherein determining that the identification information of the leading vehicle is missing, unrecognizable, invalid, or blemished is based on textual data on a windshield of the leading vehicle.

19. The system of claim 1, wherein the computer-controlled automated driving maneuver or the computer-controlled automated driving action is based on one or more operational parameters of the vehicle, wherein the operational parameters comprise a yaw rate and one or more slip parameters, the slip parameters comprising a sideslip velocity, a slip angle, a percent slip, a front slip angle corresponding to full tire saturation, or a rear slip angle corresponding to full tire saturation.

* * * * *